(12) United States Patent
Kim et al.

(10) Patent No.: US 9,212,639 B2
(45) Date of Patent: Dec. 15, 2015

(54) DEBRIS ROBUST FUEL INJECTOR WITH CO-AXIAL CONTROL VALVE MEMBERS AND FUEL SYSTEM USING SAME

(71) Applicant: Caterpillar, Inc., Peoria, IL (US)

(72) Inventors: Hoisan Kim, Dunlap, IL (US); Dana R. Coldren, Secor, IL (US); Mayank Mittal, Waukesha, WI (US)

(73) Assignee: Caterpillar Inc., Peoria, IL (US)

( * ) Notice: Subject to any disclaimer, the term of this patent is extended or adjusted under 35 U.S.C. 154(b) by 506 days.

(21) Appl. No.: 13/667,650

(22) Filed: Nov. 2, 2012

(65) Prior Publication Data

US 2014/0123936 A1   May 8, 2014

(51) Int. Cl.
| | |
|---|---|
| *F02M 21/00* | (2006.01) |
| *F02M 21/02* | (2006.01) |
| *F02M 43/04* | (2006.01) |
| *F02M 45/08* | (2006.01) |
| *F02M 63/00* | (2006.01) |
| *F02D 19/06* | (2006.01) |
| *F02D 19/10* | (2006.01) |

(52) U.S. Cl.
CPC .......... *F02M 43/04* (2013.01); *F02D 19/0689* (2013.01); *F02D 19/0694* (2013.01); *F02D 19/10* (2013.01); *F02M 21/0281* (2013.01); *F02M 45/086* (2013.01); *F02M 63/0035* (2013.01); *F02M 2200/44* (2013.01)

(58) Field of Classification Search
CPC ..... Y02T 10/36; Y02T 10/32; F02D 41/0025; F02D 41/0027; F02D 19/0694; F02D 19/10; F02D 19/0647; F02D 41/3845; F02D 2041/389
USPC .................. 123/299, 304, 456, 525
See application file for complete search history.

(56) References Cited

U.S. PATENT DOCUMENTS

| | | | | |
|---|---|---|---|---|
| 4,342,427 | A * | 8/1982 | Gray | 239/585.2 |
| 4,357,921 | A * | 11/1982 | Ciaccio et al. | 123/463 |
| 5,222,673 | A * | 6/1993 | Reiter | 239/585.1 |
| 5,720,318 | A * | 2/1998 | Nagarajan et al. | 137/625.64 |
| 5,775,599 | A * | 7/1998 | Smith et al. | 239/585.3 |
| 6,105,884 | A * | 8/2000 | Molnar et al. | 239/585.1 |
| 6,142,394 | A * | 11/2000 | Hefler et al. | 239/533.8 |
| 6,186,421 | B1 * | 2/2001 | Wahba et al. | 239/585.1 |
| 6,550,699 | B2 * | 4/2003 | Nagai et al. | 239/585.1 |
| 6,796,543 | B2 * | 9/2004 | Haeberer et al. | 251/50 |
| 8,459,577 | B2 * | 6/2013 | Manubolu et al. | 239/585.4 |
| 2003/0010320 | A1 | 1/2003 | Gillis et al. | |
| 2003/0066900 | A1 * | 4/2003 | Dantes | 239/5 |
| 2004/0011889 | A1 * | 1/2004 | Boecking | 239/533.2 |
| 2006/0138374 | A1 * | 6/2006 | Lucas et al. | 251/129.16 |
| 2009/0277421 | A1 * | 11/2009 | Eisenmenger | 123/456 |
| 2009/0277423 | A1 * | 11/2009 | Cooke | 123/494 |
| 2010/0294241 | A1 | 11/2010 | Eisenmenger et al. | |
| 2012/0111965 | A1 * | 5/2012 | Ibrahim et al. | 239/5 |

(Continued)

FOREIGN PATENT DOCUMENTS

WO    2009092484    7/2009

*Primary Examiner* — Hai Huynh
*Assistant Examiner* — Raza Najmuddin (57) ABSTRACT

A dual fuel injector utilizes first and second control valves to open and close first and second nozzle outlet sets to inject a first fuel and a second fuel, respectively. The first and second control valves have concentric lines of action, and include a self alignment feature with respect to a flat seat. The two fuels may differ in at least one of chemical identity, matter phase and pressure.

20 Claims, 9 Drawing Sheets

(56) References Cited

U.S. PATENT DOCUMENTS

| | | | |
|---|---|---|---|
| 2012/0187218 A1* | 7/2012 | Kim et al. | 239/417.5 |
| 2012/0325350 A1* | 12/2012 | Kim et al. | 137/596 |
| 2013/0047964 A1* | 2/2013 | Kim | 123/478 |
| 2013/0118448 A1* | 5/2013 | Kim et al. | 123/299 |
| 2014/0034019 A1* | 2/2014 | Mittal et al. | 123/456 |
| 2014/0034023 A1* | 2/2014 | Coldren | 123/472 |
| 2014/0061326 A1* | 3/2014 | Coldren | 239/5 |

* cited by examiner

DEBRIS ROBUST FUEL INJECTOR WITH CO-AXIAL CONTROL VALVE MEMBERS AND FUEL SYSTEM USING SAME

TECHNICAL FIELD

The present disclosure relates generally to dual fuel injectors, and more particularly to two control valves with concentric lines of action and a self alignment feature with respect to a flat seat.

BACKGROUND

There has been a growing trend in the engine industry to consider fueling engines with two fuels from a single fuel injector associated with each engine cylinder. The two fuels may differ from one another in at least one of chemical identity, matter phase and pressure. For instance, there has been increasing interest in powering compression ignition engines primarily with natural gas injected at a first pressure that is ignited from a compression ignited small pilot injection of liquid diesel fuel. However, in order to be viable, the fuel injector must generally have the ability to independently control both timing and quantity of the injection of the two different fuels. This in turn may require two separate electronically controlled valves housed within the single fuel injector. Finding a way to organize the plumbing, and arrange two independent electrical actuators and their associated control valves within a single fuel injector has proven to be difficult and problematic.

The present disclosure is directed to one or more of the problems set forth above.

SUMMARY

In one aspect, a fuel injector includes an injector body that defines a first fuel inlet, a second fuel inlet, a first nozzle outlet set, a second nozzle outlet set and a drain outlet. The injector body also has disposed therein a first control chamber and a second control chamber. A first check valve member has a closing hydraulic surface exposed to fluid pressure in the first control chamber, and is movable between a closed position in contact with a first seat to fluidly block the first fuel inlet to the first nozzle outlet set, and an open position out of contact with the first seat to fluidly connect the first fuel inlet to the first nozzle outlet set. A second check valve member has a closing hydraulic surface exposed to fluid pressure in the second control chamber, and is movable between a closed position in contact with a second seat to fluidly block the second fuel inlet to the second nozzle outlet set, and an open position out of contact with the second seat to fluidly connect the second fuel inlet to the second nozzle outlet set. A first control valve member is positioned in the injector body and is movable along a common centerline between a first position in contact with a first seat at which the first control chamber is fluidly blocked to the drain outlet, and a second position out of contact with the first seat at which the first control chamber is fluidly connected to the drain outlet. A second control valve member is positioned in the injector body and movable along the common centerline between a first position in contact with a second seat at which the second control chamber is fluidly blocked to the drain outlet, and a second position out of contact with the second seat at which the second control chamber is fluidly connected to the drain outlet. At least one of the first seat and the second seat is a flat seat. At least one of the first control valve member and the second control valve member has a self alignment feature with respect to the flat seat.

In another aspect, a fuel system includes a plurality of the fuel injectors. A source of first fuel is fluidly connected to the first fuel inlet, and a source of second fuel is fluidly connected to the second fuel inlet. An electronic controller is in control communication with each of the plurality of fuel injectors. The first fuel differs from the second fuel in at least one of chemical identity, matter phase and pressure.

In still another aspect, a method of operating the fuel system with a plurality of the fuel injectors includes injecting a first fuel from the first nozzle outlet set by moving the first control valve member from a first position to a second position along a common centerline. A second fuel is injected from a second nozzle outlet set by moving a second control valve member from a first position to a second position along the common centerline. One of the first and second control valve members is self aligned by contacting the flat seat.

DETAILED DESCRIPTION

Figure 1:
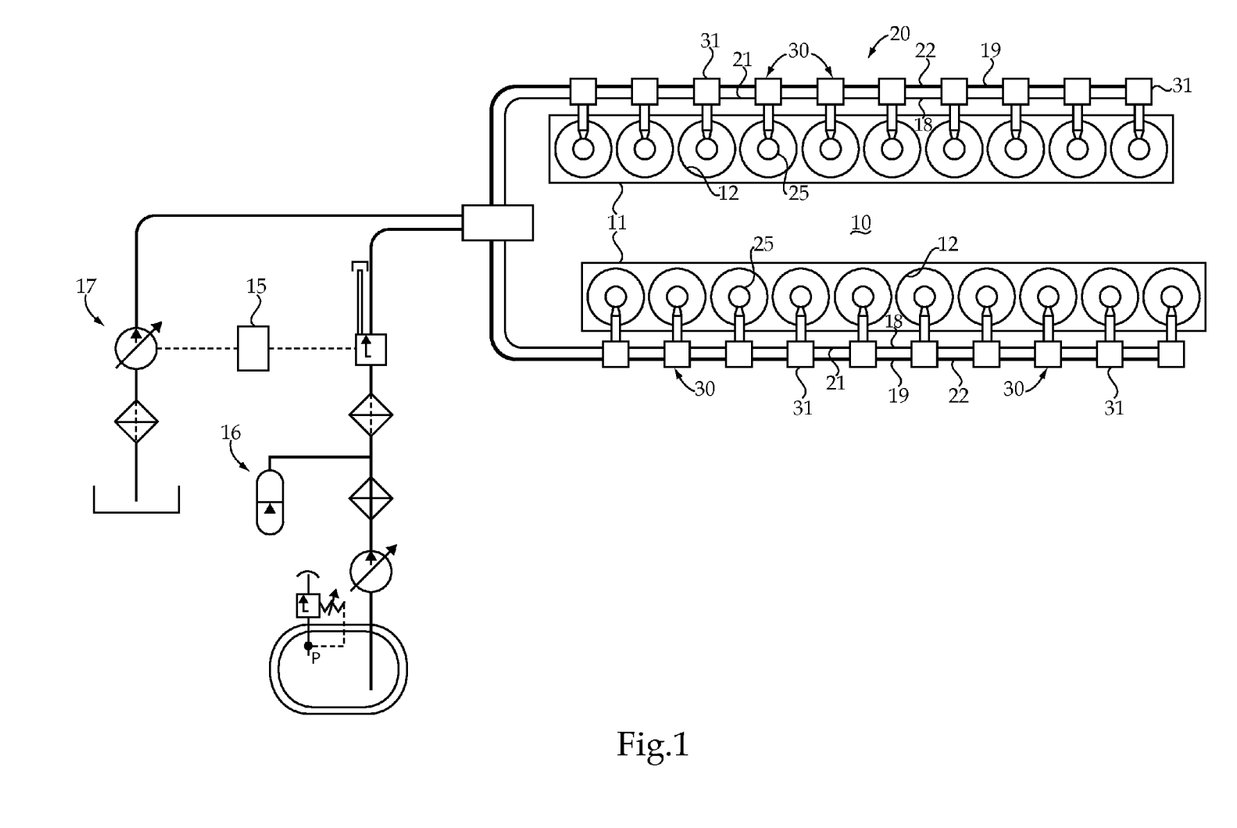
FIG. 1 is a schematic view of a dual fuel engine according to the present disclosure.
Figure 2:
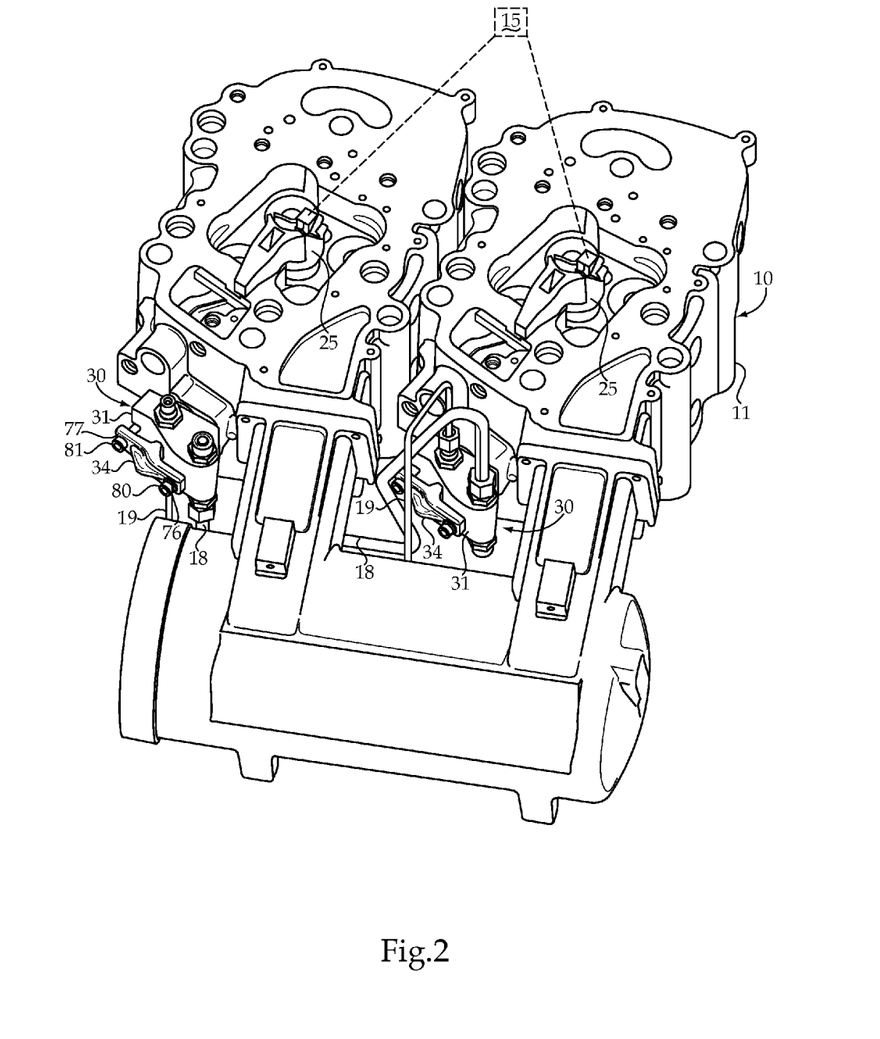
FIG. 2 is a perspective view of a portion of the engine and dual fuel common rail system for the engine of FIG. 1.
Figure 3:
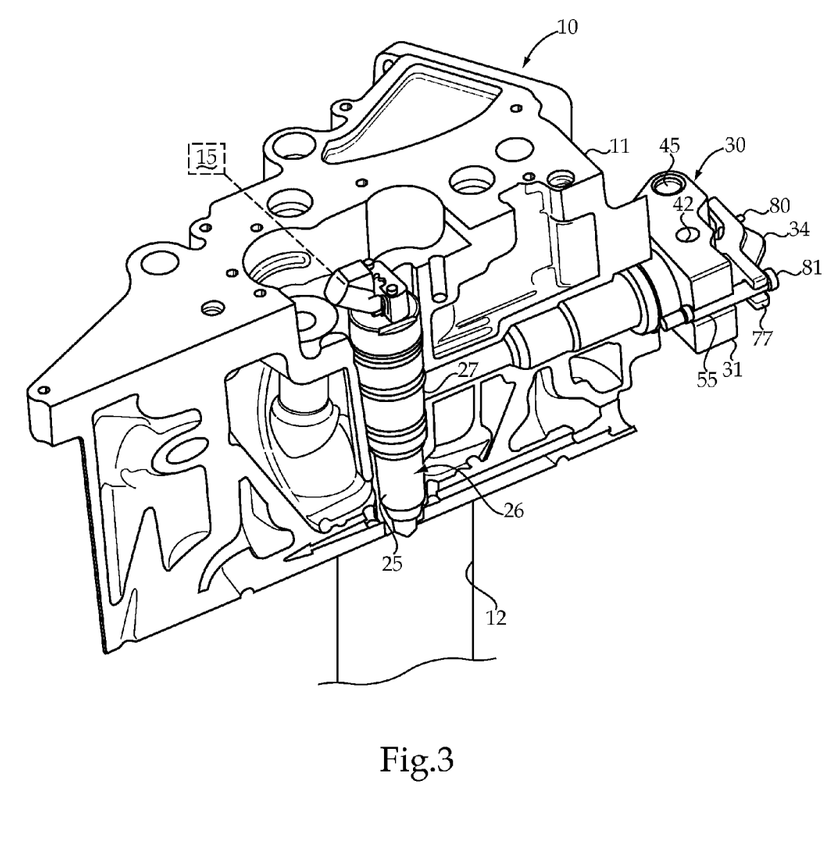
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are controlled by an electronic engine controller 15 in a known manner. The gas supply and pressure control devices 16 may include a pressurized cryogenic liquefied natural gas tank with an outlet fluidly connected to a variable delivery cryogenic pump. Devices 16 may also include a heat exchanger, an accumulator, a gas filter and a fuel conditioning module that controls the supply and pressure of gaseous fuel to gaseous fuel common rail 21. The liquid supply and pressure control devices 17 may include a diesel fuel tank, fuel filters and an electronically controlled high pressure fuel pump that supply liquid fuel to, and control pressure in, liquid fuel common rail 22.

As best shown in FIGS. 1 and 2, the blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2.

Figure 4:
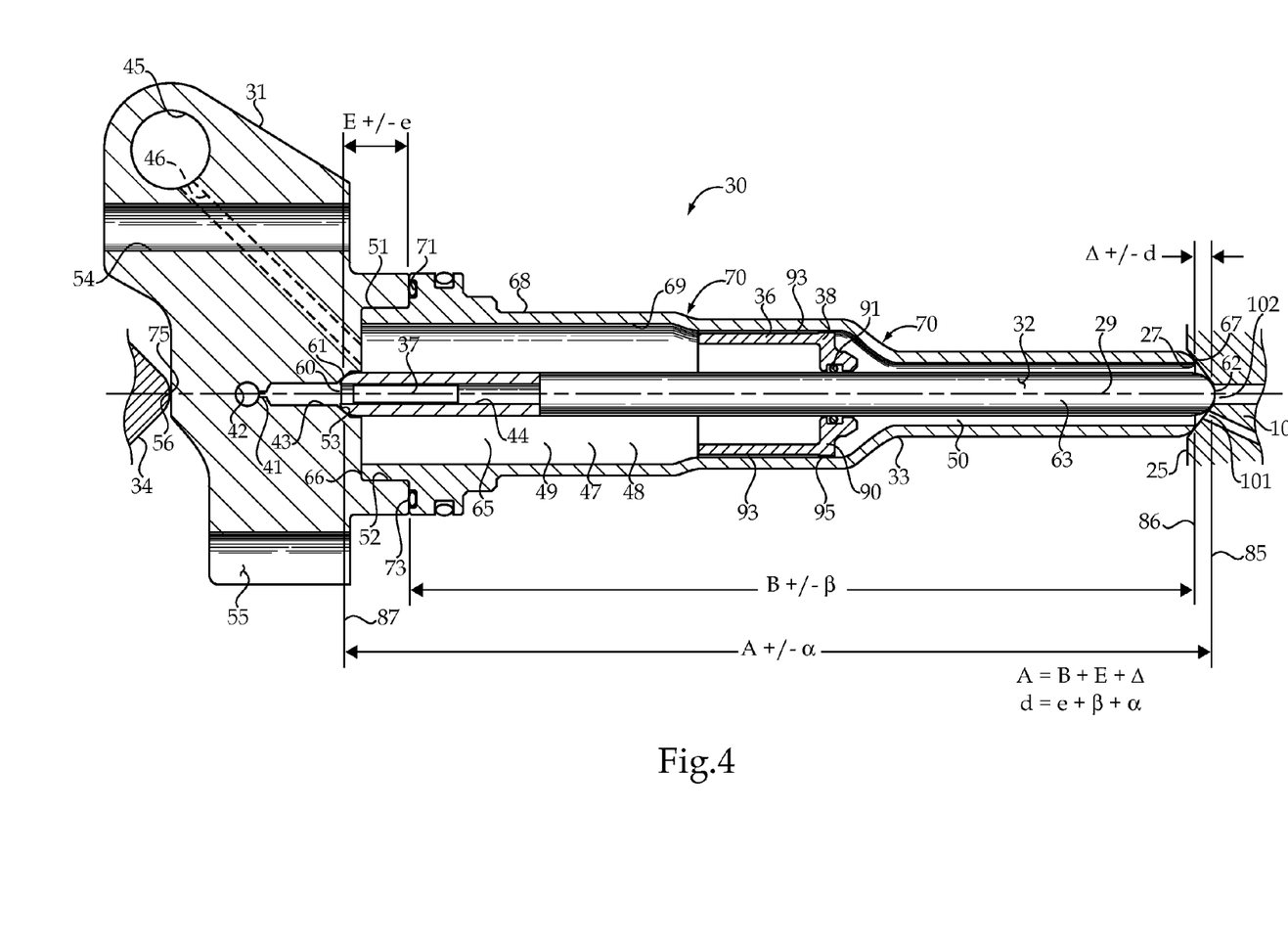
FIG. 4 is a sectioned side view through a co-axial quill assembly according to another aspect of the present disclosure.

Referring in addition to FIG. 4, the dual fuel common rail system 20 includes a co-axial quill assembly 30 with an inner quill 32 and an outer quill 33 in sealing contact with a common conical seat 27 of each fuel injector 25. In the illustrated embodiment, a pressure damping chamber 48 consists of an upstream segment 49 of the gaseous fuel conduit 47 that has a flow area at least several times larger than the downstream segment 50 of the gaseous fuel conduit 47. The pressure damping chamber 48 may be defined in each co-axial quill assembly 30 in order to damp pressure waves moving from gaseous fuel common rail 21 toward the respective fuel injector 25, especially during an injection event. The pressure damping chamber 48 has a volume greater than a gaseous fuel volume 26 (nozzle chamber, sac and gas passageways) within the respective fuel injector 25. Those skilled in the art will appreciate that the available space constraints on fuel injector 25 limit the size of the gaseous fuel volume 26 within each fuel injector 25. The gas volume 26 in each fuel injector may likely be many times less than a rated gaseous injection volume from injector 25.

One strategy for sizing the pressure damping chamber 48 may start with the continuity equation, and then derive an equation for the pressure response of a particular fluid (e.g. natural gas) in a specific volume (the pressure damping chamber 48) to a flow rate arriving (from the rail 21) to a flow rate leaving the volume (injection rate). The idea is to reduce the pressure change reaction to the volume flow of the fluid to a satisfactory level. The pressure damping chamber 48 should provide sufficient absorbtion of arriving pressure waves to damp out reflective transients. Thus, one might consider a maximum rated volume of gaseous fuel delivery for fuel injector 25 in the engine 10, and the gas injection pressure, and size a volume of the pressure damping chamber 48 that will provide sufficient absorbtion of the pressure waves.

Referring again to FIGS. 2-4, each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. Fastener 80 may include a spherical washer and bolt, while fastener 81 may be a shoulder bolt that is utilized to set an attitude of load adjustment clamp 34. For instance, the proper assembly may require connection of co-axial quill assembly 30 to engine housing 11 with first fastener 81. Bolt 80 can then be tightened to a pre-determined torque that assures proper seating seal contact between outer quill 33 and inner quill 32, independently but simultaneously, on common conical seat 27 of fuel injector 25. During this process, load adjustment clamp 34 will pivot through some limited small angle. The fasteners 80 and 81 are received in fastener bore 54 and fastener slot 55, respectively of blocks 31.

Each block 31 of each co-axial quill assembly 30 defines a gaseous rail passage 45 that is oriented perpendicular to the axis 29 of inner quill 32 and fluidly connected to a gaseous fuel passage 46 that opens at one end into a quill chamber 52 outside of conical seat 53. The gaseous rail passage 45 may extend completely through block 31 in order to facilitate the daisy chain connection structure shown in FIGS. 1 and 2. Each block 31 also includes a liquid rail passage 42, which may extend all the way through, and that is oriented perpendicular to the axis 29 and fluidly connected to a liquid fuel passage 43 that opens on one end into quill chamber 52 through conical seat 53. A segment of liquid fuel passage 43 may have an orifice segment 41, as shown, to reduce a flow rate from the liquid rail 22 to help manage transients in the liquid quill 32. The minimum area required for the orifice 41 may be computed by dividing the total injection quantity by the injection duration, and sizing the orifice to allow that delivery with a minimum pressure drop. Thus, the sizing of that flow area may relate to the performance characteristics of fuel injector 25. The inner quill 32 defines a liquid fuel conduit 44 extending between a first end 60 and a second end 62. First end 60 includes an annular spherical surface 61 that rests in contact at a gage line 87 with, but remains unattached to, the conical seat 53, and a gage line 85 on an annular spherical surface at second end 62 in contact with common conical seat 27 of fuel injector 25. The outer quill 33 has a hollow interior 65 separating a first end 66 from a second end 67. The first end 66 is received in the quill chamber 52, and the outer quill 33 may be attached to block 31 with mating threads 51.

Practical manufacturing limitations may forbid mass production of co-axial quill assemblies 30 in which either the inner quill 32 or the outer quill 33 are integrally formed with block 31, or each other. Thus, an annular seal 71 serves to seal against leakage of gaseous fuel from between block 31 and outer quill 33 of co-axial quill assembly 30. In this embodiment, annular seal 71 includes an o-ring 73 in a face seal configuration trapped between block 31 and outer quill 33. In the illustrated construction, the inner quill 32 is out of contact with the outer quill 33 in each co-axial quill assembly 30. A gaseous fuel conduit 47 is fluidly connected to gaseous fuel passage 46, and also extends between outer surface 63 of inner quill 32 and the inner surface 69 of outer quill 33. Spatial constraints in engine housing 11 may require that an upstream half 49 of the gaseous fuel conduit 47 have a pressure damping chamber 48 with a volume larger than a volume of a downstream half 50 of the gaseous fuel conduit 47. Thus, a majority of the volume of the pressure damping chamber 48 may be located in an upstream half 49 of the gaseous fuel conduit 47 both within outer quill 33 and within quill chamber 52. As stated earlier, the pressure damping chamber 48 should be of sufficient size and shape to damp pressure waves arriving from the gaseous fuel passage 46 in order to reduce variations in gaseous fuel injection rates and quantities. In this specific example, the available space in engine housing 11 may permit the relatively uniform wall thickness of the outer quill 33, which is defined between an inner surface 69 and outer surface 68, to include two step wise diameter reductions 70 along the axis 29 in a direction of second end 67. Nevertheless, other engine housing geometries may vary substantially from that shown. The gaseous rail passage 45 of each block 31 may define a portion of the gaseous fuel common rail 21. Likewise, the liquid rail passage 42 of each block 31 may define a segment of the liquid fuel common rail 22 as best shown in FIGS. 1 and 2.

Referring more specifically to FIG. 4, reliable sealing contact between the co-axial quill assembly 30 and fuel injector 25 against leakage of both gaseous and liquid fuels may be accomplished by tightening only a single fastener 80 to a predetermined torque load. This may be accomplished by locating the gage line 85 at the second end 62 of the inner quill 32 to extend a predetermined target distance Δ beyond the gage line 86 at the second end 67 of the outer quill 33. The gage line 85, 86 is the sealing contact line. A predetermined load may be placed on block 31 by load adjusting clamp 34 acting along axis 29 so that the outer and inner quills 33, 32 seat and sealingly engage on common conical seat 27 at their respective gage lines 85, 86. Tightly controlling the predetermined target distance Δ may be accomplished in a number of ways. In the illustrated embodiment, target distance Δ is held to a tolerance d that is a stack up of tolerance e, β and α. Dimension distance E+/−tolerance e corresponds to the distance between the gage line of conical seat 53 and the shoulder face against which o-ring 73 seals on block 31. Dimension distance B+/−tolerance β corresponds to the distance from the shoulder surface of outer quill 33 to the gage line 86 at second end 67 of outer quill 33. Dimension distance A+/−tolerance α corresponds to the distance between the gage lines 87, 85 at opposite ends of inner quill 32. Provided that the distances A, B and E can be held within reasonable tolerances, the tolerance stack up d on target distance Δ can be made acceptable such that proper sealing at conical seat 27 of fuel injector 25 is reliably made. Tolerance stack up d equals e plus β plus α. During preassembly, the predetermined target distance Δ may be set within an acceptable tolerance d by selecting a block 31 with an appropriate dimension distance E+/−e, an outer quill 33 with an appropriate dimension distance B+/−β, and a inner quill 32 with an appropriate dimension distance A+/−α. Provided that the tolerance stack up of e+β+α yields an acceptable tolerance d, simple nearly fool proof installation may be assured by simply tightening a single fastener 80 to an appropriate torque load to apply an appropriate load along centerline 29.

Those skilled in the art will appreciate that the inner and outer quills 32, 33 may have different spring rates and may require different load levels to ensure proper sealing at common conical seat 27. Therefore, some differential length, which may be positive, negative or zero, depending upon the specific design, quill materials and geometries may need to be added to the above described dimensions in order to ensure proper sealing contact at fuel injector 25.

In order to trap metallic debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner quill 32. The gaseous fuel edge filter 36 is shown positioned within outer quill 33 between the two step wise diameter reductions 70. In the illustrated embodiment, gaseous fuel edge filer 36 may have a combined dual purpose by including a retainer 38 that can be thought of as in contact with the inner surface 69 of outer quill 33 and of the outer surface 63 of inner quill 32. In this embodiment, retainer 38 may include an o-ring 91 that encourages gaseous fuel traveling along gaseous fuel conduit 47 to move through filter passages 93 between edge filter 36 and outer quill 33 to trap metallic debris upstream from fuel injector 25. The outer surface of retainer 38 includes a plurality of filter passages 93 that are distributed around, and oriented perpendicular to the axis 29. In this embodiment, retainer 38 may comprise a suitable metallic piece, such as steel, that is machined to the shape as shown and also includes an o-ring 91 that grips the outer surface 63 of inner quill 32. Retainer 38 may be connected to the outer quill 33 with a metal to metal interference fit 95.

Because inner quill 32 is unattached to either outer quill 33 or block 31, co-axial quill assembly 30 may include the retainer 38 that is in contact with the outer surface 63 to maintain the inner quill 32 with the block 31 and outer quill 33 during pre-installation handling. In other words, retainer 38 may inhibit inner quill 32 from falling out of outer quill 33 during pre-installation handling. The edge filter 36/retainer 38 of the disclosure allows the co-axial quill assemblies 30 to be preassembled with a precisely predetermined target distance Δ so that installation is made easy and simple without the need for custom adjustments at each co-axial quill assembly 30. In the illustrated embodiment, consistent leak free installation may only require torqueing fastener 80 to a predetermined load, without any other considerations.

Referring in addition to FIGS. 5-9, a fuel injector 25 according to the present disclosure includes an injector body 100 that defines a first nozzle outlet set 103, a second nozzle outlet set 104 and a drain outlet 105. Injector body 100 also defines a first fuel inlet 101 and a second fuel inlet 102 that can be seen in the sectioned view of FIG. 4 opening through the common conical seat 27 of fuel injector 25. Disposed within injector body 100 are a first control chamber 106 and a second control chamber 107. A first check valve member 110 has a closing hydraulic surface 112 exposed to fluid pressure in the first control chamber 106. The first check valve member 110 is movable between a closed position, as shown, in contact with a first seat 108 to fluidly block the first fuel inlet 101 to the first nozzle outlet set 103, and an open position out of contact with the first seat 108 to fluidly connect the first fuel inlet 101 to the first nozzle outlet set 103 via a passage not visible in the sectioned view of FIG. 5. A second check valve member 120 has a closing hydraulic surface 121 exposed to fluid pressure in the second control chamber 107. The second check valve member 120 is movable between a closed position, as shown, in contact with a second seat 113 to fluidly block the second fuel inlet 102 to the second nozzle outlet set 104, and an open position out of contact with the second seat 113 to fluidly connect the second fuel inlet 102 to the second nozzle outlet set 104 via a passage not visible in the sectioned view of FIG. 5. Thus, injection of a first fuel through first nozzle outlet set 103 is facilitated by movement of first check valve member 110, while injection of a second fuel through second nozzle outlet set 104 is facilitated by movement of the second check valve member 120. Those skilled in the art will appreciate that the first and second nozzle outlet sets 103, 104 might be expected to each include six nozzle outlet sets that are arranged around respective centerlines in a manner well known in the art. However, nozzle outlet sets 103 and 104 could each include as few as one nozzle outlet or any number of nozzle outlets in any arrangement without departing from the present disclosure.

Figure 5:
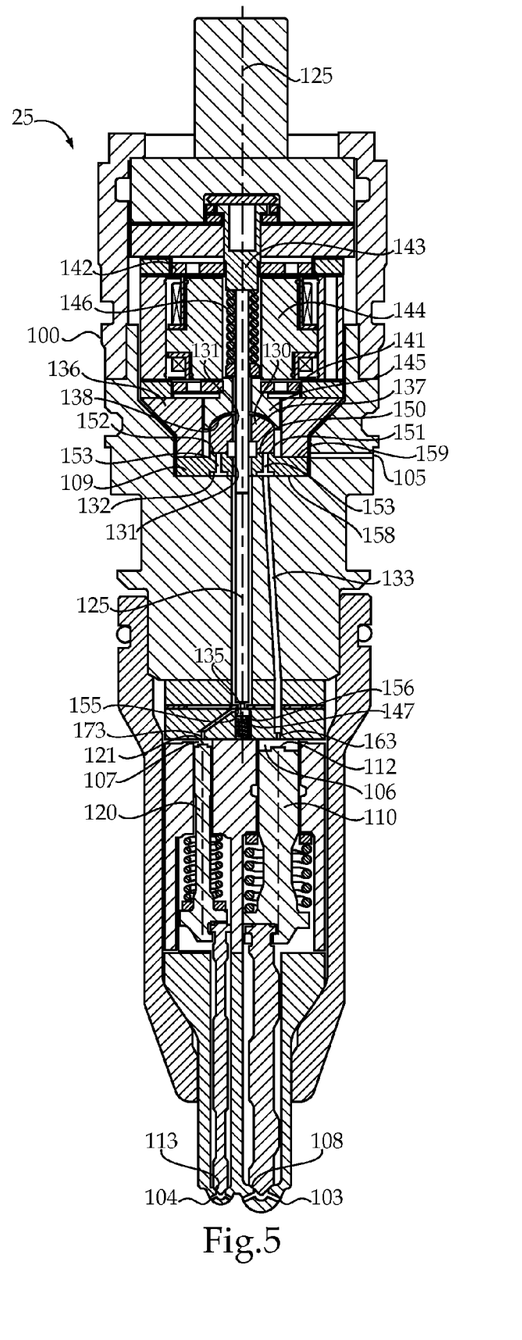
FIG. 5 is a sectioned front view of a fuel injector according to an aspect of the present disclosure.

A first control valve member 130 is positioned in injector body 100 and is movable along a common centerline 125 between a first position at which the first control chamber 106 is fluidly blocked to the drain outlet 105, and a second position at which the first control chamber 106 is fluidly connected to the drain outlet 105. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in the injector body 100 and movable along the common centerline 125 between a first position at which the second control chamber 107 is fluidly blocked to the drain outlet 105, and a second position at which the second control chamber 107 is fluidly connected to the drain outlet 105.

When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through the second nozzle outlet set 104. In the illustrated embodiment, the second control valve member 135 is intersected by the common centerline 125, but the first control valve member 130 defines a bore 131 therethrough that is concentric with common centerline 125. In the illustrated fuel injector 25, the respective control valve members 130, 135 may be moved to one of their respective first and second positions with first and second electrical actuators, respectively. The control valve members 130, 135 may be biased to the other of their respective first and second positions by a spring 146, 147. In particular, a first armature 141 may be attached to a pusher 145 in contact with first control valve member 130. The first armature 141, the pusher 145 and the first control valve member 130 may be biased to the position shown in contact with flat seat 151 by biasing spring 146. The control valve member 130 may rotate slightly about axis perpendicular to common centerline 125 through the action of a self alignment feature 136 that allows convex surface 137 to move on a concave bearing surface 138 each time control valve member 130 contacts flat seat 151. Thus, first armature 141 can be thought of as being operably coupled to move the first control valve member 130, and a second armature 142 may be operably coupled to move the second control valve member 135 by way of a plurality of pushers 143. A shared stator 144 separates the first armature 141 from the second armature 142. First control valve member 130 is biased toward its first position to block first control chamber 106 from drain outlet 105 by spring 146. First and second armatures 141, 142 are also biased toward their initial respective initial air gap positions by spring 146. A second spring 147 biases the second control valve member 135 toward its first position at which the second control chamber 106 is fluidly blocked to drain outlet 105.

Figure 6:
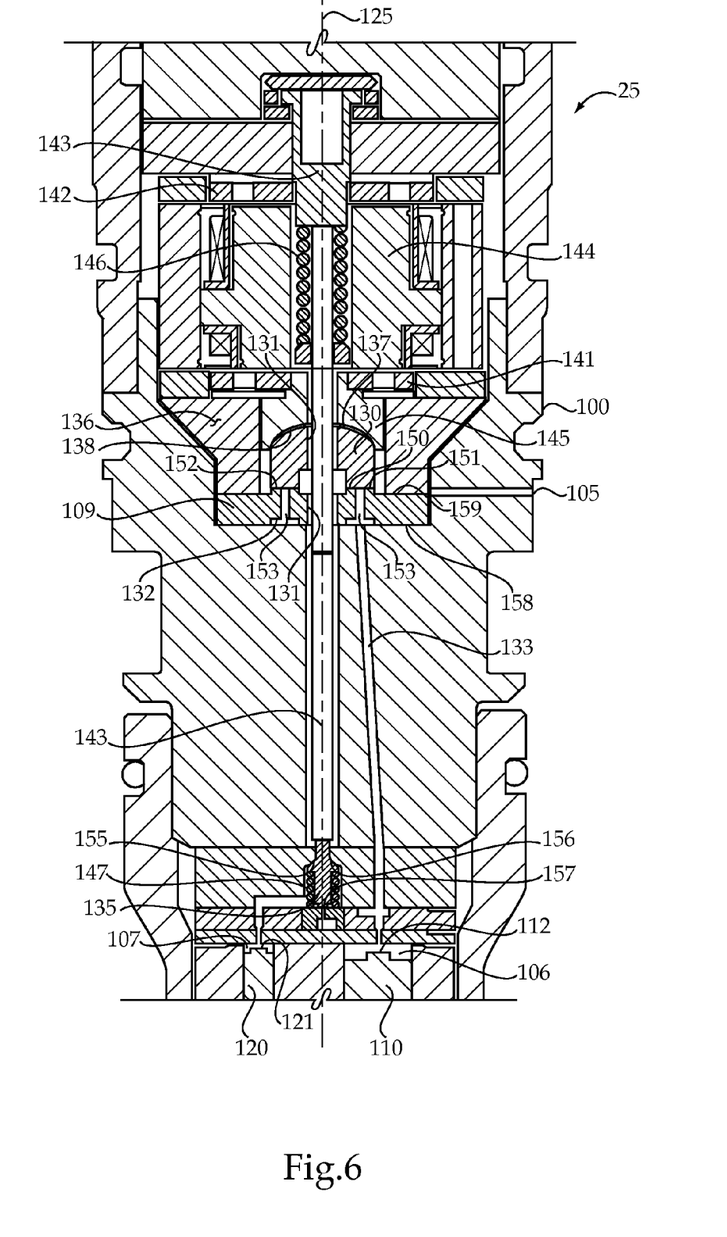
FIG. 6 is an enlarged sectioned front view of the control valve portion of the fuel injector shown in FIG. 5.
Figure 7:
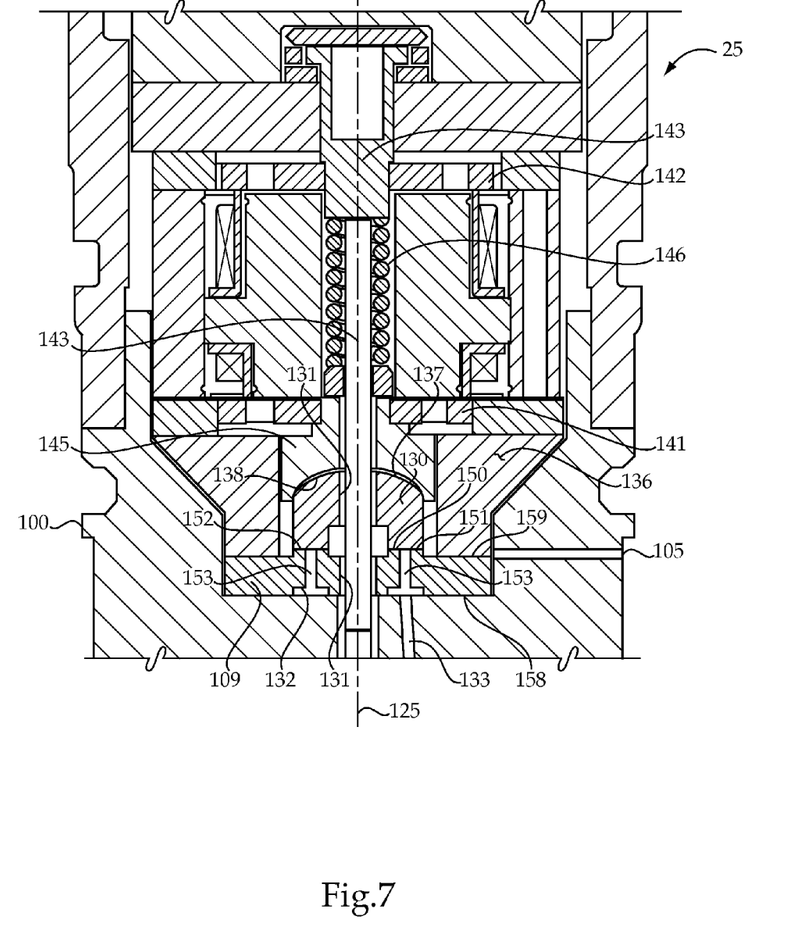
FIG. 7 is still another enlargement of a sectioned front view of a portion of the fuel injector of FIG. 5.
Figure 8:
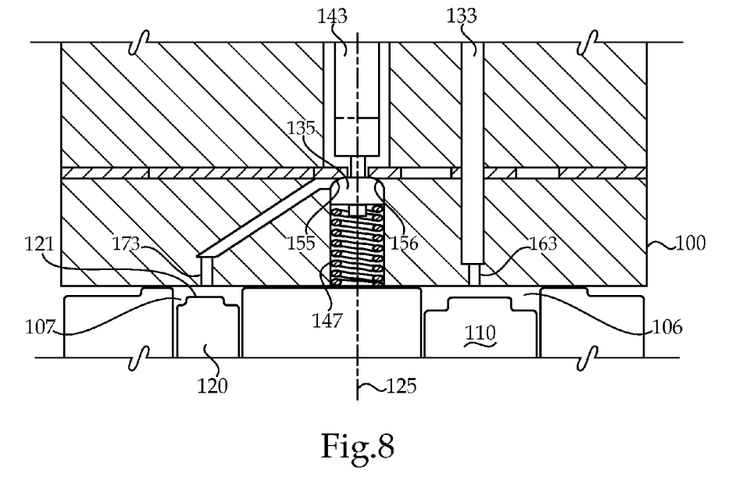
FIG. 8 is partial enlarged sectioned view of the control chamber portion of the fuel injector of FIG. 5.
Figure 9:
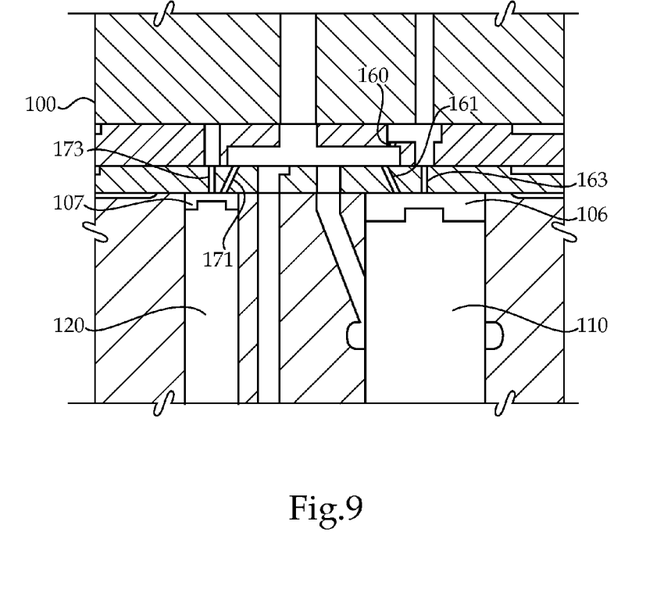
FIG. 9 is an enlarged sectioned front view similar to FIG. 8 except through a different section of the fuel injector of FIG. 5.

Referring now more specifically to the enlarged views of FIGS. 6 and 7, the first control valve member 130 is in contact and out of contact with a first valve seat 150 at the first position and the second position, respectively. Likewise, the second control valve member 135 is in contact and out of contact with a second valve seat 155 at its first position and second position, respectively. In the illustrated embodiment, at least one of the first valve seat 150 and second valve seat 155 is a flat seat 151, 156. However, one or the other may be a conical seat. In the illustrated embodiment, first valve seat 150 is a first flat seat 151, and the second valve seat 155 is a second flat seat 156. As best shown in FIG. 7, first control valve member 130 may be coupled to move with first armature 141 responsive to de-energizing the lower coil mounted in common stator 144. When the lower coil mounted in common stator 144 is energized, armature 141 and pusher 145 are lifted upward allowing the high pressure in control passage 133 to push first control valve member 130 out of contact with flat seat 151 to fluidly connect control chamber 106 to drain outlet 105. In the illustrated embodiment, first control chamber 106 is fluidly connected to flat seat 151 by a control passage 133. Although not necessary, control passage 133 may open through flat seat 151 via spill passages 153 extending between an annular groove 132 and the flat seat 151. In order to provide a large flow area and balance to the flow when first control chamber 106 is fluidly connected to drain outlet 105 annular groove 132 of control passage 133 may also open through a third flat seat 152. Thus, the first control valve member 130 may be in contact and out of contact with a third flat seat 152 at the first position and second position, respectively. In the illustrated embodiment, the first control chamber 106 may always be fluidly connected to the high pressure in the second fuel inlet 102 via an F orifice 160 and a Z orifice 161. The upstream ends of respective F and Z orifices 160 and 161 may be fluidly connected to the second fuel inlet 102 via passages not visible in the sectioned views. However, that fluid connection may always be unobstructed. The first control chamber 106 is fluidly connected to the control passage 133 via a so called A orifice 163. Thus, when first control valve member 130 lifts off of flat seat 151 (and flat seat 152), first control chamber 106 becomes fluidly connected to drain outlet 105 via A orifice 163, control passage 133 annular groove 132 and spill passages 153. During this time, the high pressure in second fuel inlet 102 will also be directly fluidly connected to drain outlet 105 via both the Z orifice 161 and the F orifice 160. However, the connection to drain outlet 105 is sufficient to lower pressure in control chamber 106 to allow the first check valve member 110 to lift and open to commence an injection event. When first control valve member 130 is moved downward to close flat seat 151, the parallel fluid connections to high pressure second fuel inlet 102 facilitated by F orifice 160 and Z orifice 161 allow pressure to quickly build in control chamber 106 to abruptly end the injection event. The F orifice may be eliminated without departing from the intended scope of the present disclosure.

Figure 10:
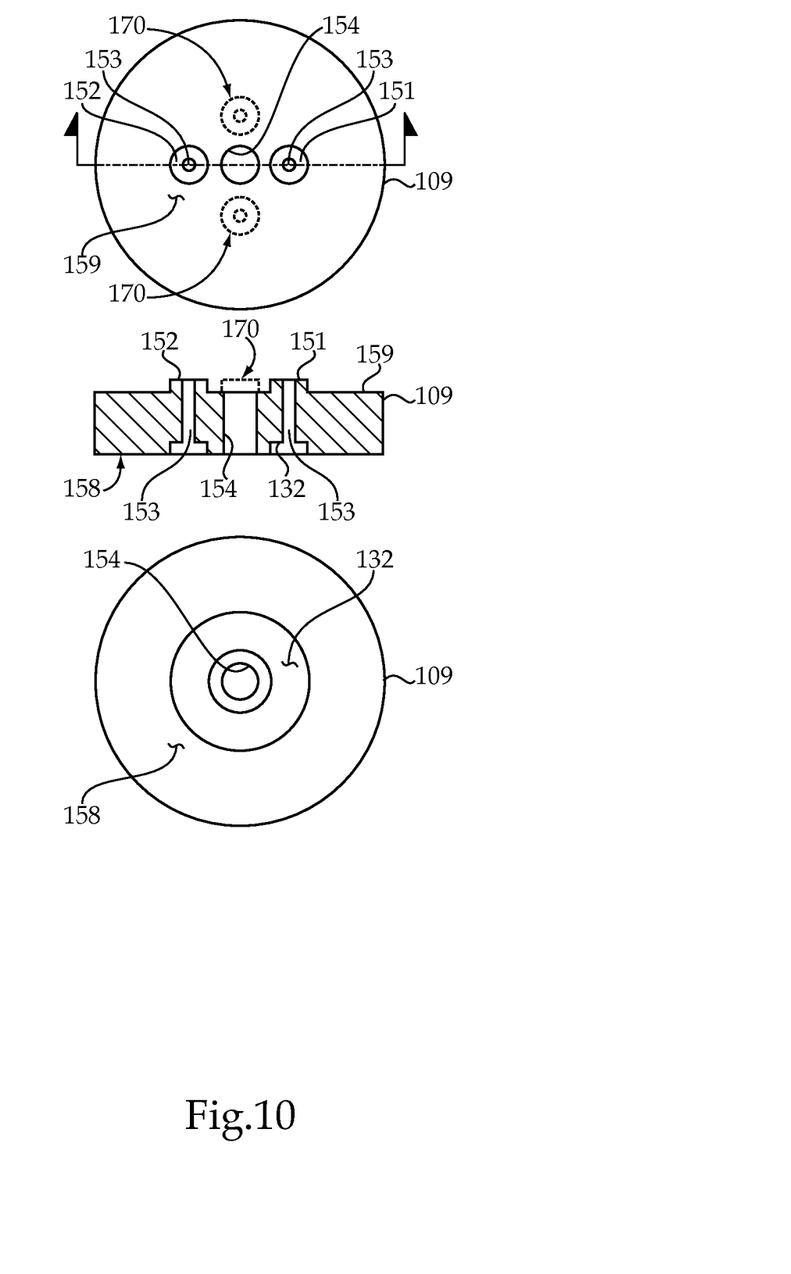
FIG. 10 includes a top, sectioned side and bottom views of a valve plate according to one aspect of the disclosure.

Referring briefly in addition to FIG. 10, the flat seats 151 and 152 may be located on a disk shaped valve plate 109 that defines the annular groove 132 on one side 158, and includes flat seats 151 and 152 on an opposite side 159. Valve plate 109 may be considered a portion of injector body 100, because it remains stationary at all times, preferably by being clamped in place at time of assembly. Valve plate 109 may define a bore through which pushers 143 move. FIG. 10 shows a top, side sectioned and bottom view of one example valve plate 109 according to one aspect of the present disclosure. Valve plate 109 may include as few as one spill passage 153 that opens through one flat seat 151, may appear as shown, or may include additional seat locations 170 as desired. When considering the number of seat locations 151, 152, 170, one may consider balancing the need to bias first control valve member 130 effectively in contact with the seats 151, 152 by the action of biasing spring 146 to effect a near zero leak between injection events, against a counter vailing consideration in avoiding creation of a flow restriction in the vicinity of the flat seats 151, 152, when the valve is open. Those skilled in the art will appreciate that consistent operation between several fuel injectors may require that the flow restrictions in the control plumbing be located at controlled orifices 160, 161 and 163, rather than at the valve seat 151, 152. On the other hand, resorting to ever higher pre-loads on biasing spring 146 can undermine performance of the control valve.

Second control valve member 135 may be trapped to move between the first position in contact with valve seat 155, which is a flat seat 156, and a second position out of contact with flat seat 156 to open a fluid connection between control chamber 107 and drain outlet 105. Second control chamber 107 may also be fluidly connected to the high pressure of second fuel inlet 102 via its own Z orifice 171, whose upstream end would be fluidly connected to the second fuel inlet 102 via passages not visible in the sectioned views. When the upper coil is energized, second armature 142 will move downward with pushers 143 to move second control valve member 135 out of contact with flat seat 156 to fluidly connect second control chamber 107 to drain outlet 105 via A orifice 173, past flat seat 156 and via a fluid connection to drain outlet 105 not visible in the sectioned views. Control of second check valve member 120 may be accomplished without an F orifice in this fluid circuit. However, those skilled in the art will appreciate that the plumbing could be modified to include an F orifice in a manner similar to that associated with first check valve member 110 without departing from the present disclosure. When the upper coil is energized, control valve member 135 also moves downward to drop the pressure in control chamber 107 to more quickly facilitate upward movement of second check valve member 120 to commence an injection event. When the upper coil is de-energized, armature 142 moves upward under the action of spring 146, and control valve member 135 moves upward to close flat seat 156 under the action of the second spring 147. When this occurs, high pressure quickly returns to control chamber 107 via the fluid connection facilitated by the Z orifice 171, to quickly hasten the downward movement of second check valve member 120 to end the injection event. Reiterating, the first control chamber 106 may be fluidly connected to the second fuel inlet 102 through two orifices 160, 161 (an F orifice and a Z orifice) that are fluidly in parallel when the first control valve member 130 is at its first position. Each of the first control chamber 106 and second control chamber 107 is fluidly connected to the second fuel inlet 102 when the first control valve member 130 and the second control valve member 135 are in the respective first positions and when in the respective second positions. Thus, liquid diesel fuel may be used as a control fluid for both liquid and gaseous fuel injection events.

In the illustrated embodiment, the first check valve member 110 and the second check valve member 120 move along respective lines 111 and 122 that are each parallel to, but spaced apart from common centerline 125. Nevertheless, those skilled in the art will appreciate that the structure could be different. For instance, dual concentric check valve members that were concentric with common centerline 125 would also fall within the scope of the present disclosure.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure also finds particular applicability to debris robust fuel injectors 25 that must operate effectively with lesser fuel qualities, especially fuels utilized in less restrictive jurisdictions that do not have good control strategies for preventing fuel contamination.

Referring back to all of the FIGS. 1-10, a method of operating dual fuel engine 10 begins by assembling a dual fuel common rail system 20 to an engine housing 11. Gaseous fuel is supplied from the gaseous fuel common rail 21 to each of the plurality of fuel injectors 25 by a respective co-axial quill assembly 30. Likewise, liquid fuel from a liquid fuel common rail 22 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic engine controller 15 to the fuel injector 25. In particular, a gaseous fuel injection event is initiated by energizing the lower electrical actuator (lower coil) to move armature 141 and first control valve member 130 upward out of contact with flat seats 151 and 152. This fluidly connects control chamber 106 to drain outlet 105 to reduce pressure acting on closing hydraulic surface 112. The gaseous fuel check valve 110 then lifts out of contact with seat 108 to commence spray of gaseous fuel out of first nozzle outlet set 103. The injection event is ended by de-energizing the lower electrical actuator to allow armature 141 and control valve member 130 to move downward under the action of spring 146 back into contact to close flat seats 151 and 152. The usage of flat seats 151, 152 and 156 are believed more robust relative to the small debris that might find its way into fuel injector 25 in the liquid fuel entering at fuel inlet 102. In other words, small debris may be more easily flushed past flat seats 151, 152 and 156 rather than becoming trapped or positioned to undermine the action of the proper sealing at seats 151, 152, 156. Conical seats may be considered less debris robust than the flat seats of the present disclosure. When this occurs, pressure abruptly rises and control chamber 106 acting on closing hydraulic surface 112 to push check valve member 110 back downward into contact with seat 108 to end the gaseous fuel injection event. Also, liquid fuel from the fuel injector 25 is injected directly into engine cylinder 12 from the same fuel injector 25 responsive to a liquid fuel injection signal from electronic engine controller 15. In particular, a liquid fuel injection event is initiated by energizing the upper electrical actuator to move armature 142 downward along common centerline 125. This causes pushers 143 to move second control valve member 135 out of contact with flat seat 156. This in turn relieves pressure in control chamber 107 allowing check valve member 120 to lift out of contact with seat 113 to commence a liquid fuel injection event out of nozzle outlet set 104. To end the injection event, the upper electrical actuator (upper coil) is de-energized. When this is done, spring 146 pushes armature 142 upward while spring 147 pushes second control valve member 135 back up into contact with flat seat 156 to close the fluid connection between control chamber 107 and drain outlet 105. When this is done, pressure acting on closing hydraulic surface 121 quickly rises causing check valve member 120 to move downward and back into contact with seat 113 to end the liquid fuel injection event. Both liquid and natural gas injection events are ended by fluidly connecting the respective control chambers 107, 106 to the liquid fuel common rail 22 through respective F orifice 160, and Z orifices 161, 171 that are fluidly in parallel.

Each time first control valve member 130 comes in contact with flat seats 151, 152, control valve member 130 is self aligned due to its ability to rotate with respect to axes perpendicular to common centerline 125 via the self alignment feature 136. Likewise, the second control valve member 135 will self align with each contact with flat seat 156 due to its slight ability to also rotate about axes perpendicular to common centerline 25. Those skilled in the art will appreciate that a self alignment feature according to the present disclosure could take other forms without departing from the present disclosure. For instance, the location of the convex surface 137 and the concave surface 138 may have their locations reversed. Also, the spring 147 could act on a different shape control valve member 135 that might have a rounded surface in contact with spring 147 rather than the ledge and guide projection shown, without departing from the present disclosure. In the context of the present disclosure, a control valve member with the self alignment feature will not include a guide clearance of the type associated with the movement of may be pusher 145, and check valve members 110 and 112, for instance. Thus, in this disclosure, at least one, and preferably both, of the first control valve member 130 and second control valve member 135 will have a self alignment feature 136 with respect to a flat seat, 151, 152 and 156.

It should be understood that the above description is intended for illustrative purposes only, and is not intended to limit the scope of the present disclosure in any way. In summary, the flat seats on the control valves can seal pressure from the nozzle check control chambers 106, 107 without any substantial rail pressure leakage. The self alignment feature(s) 136 of the control valves can make resetting and effective sealing easier without over-reliance upon ever more stringent orthogonality tolerances and the like. In addition, increased drain flow area, such as that provided by multiple spill passages 153 may help to provide less variation of fuel deliveries compared to some other potential designs. Thus, those skilled in the art will appreciate that other aspects of the disclosure can be obtained from a study of the drawings, the disclosure and the appended claims.

What is claimed is:

1. A fuel injector comprising:
   an injector body defining a first fuel inlet, a second fuel inlet, a first nozzle outlet set, a second nozzle outlet set, and a drain outlet, and defining therein a first control chamber and a second control chamber;
   a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;
   a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;
   a first control valve member positioned in the injector body and being movable along a common centerline between a first position in contact with a first seat at which the first control chamber is fluidly blocked from the drain outlet, and a second position out of contact with the first seat at which the first control chamber is fluidly connected to the drain outlet; and
   a second control valve member positioned in the injector body and being movable along the common centerline between a first position in contact with a second seat at which the second control chamber is fluidly blocked from the drain outlet, and a second position out of contact with the second seat at which the second control chamber is fluidly connected to the drain outlet,
   at least one of the first seat and the second seat being a flat seat, and
   at least one of the first control valve member and the second control valve member having a self alignment feature with respect to the flat seat.

2. The fuel injector of claim 1 wherein one of the first control valve member and the second control valve member is intersected by the common centerline, and
   an other of the first control valve member and the second control valve member defines a bore therethrough that is concentric with the common centerline.

3. The fuel injector of claim 1 further comprising a first armature operably coupled to move the first control valve member;
   a second armature operably coupled to move the second control valve member; and
   a shared stator separating the first armature from the second armature.

4. The fuel injector of claim 1 wherein the flat seat is a first flat seat associated with the first control valve member; and
   the second control valve member is in contact and out of contact with a second flat seat at the first position and the second position, respectively.

5. The fuel injector of claim 4 wherein the first control valve member is in contact and out of contact with a third flat seat at the first position and the second position, respectively.

6. The fuel injector of claim 1 wherein the flat seat is located on a valve plate that defines an annular groove on one side, includes the flat seat on an opposite side, and defines a spill passage extending between the annular groove and the flat seat.

7. The fuel injector of claim 1 wherein the first check valve member and the second check valve member move along a first line and a second line, respectively, that are each parallel to, but spaced apart from, the common centerline.

8. The fuel injector of claim 1 wherein the first control chamber is fluidly connected to one of the first fuel inlet and the second fuel inlet through two orifices that are fluidly coupled in parallel when the first control valve member is in the first position.

9. The fuel injector of claim 1 wherein each of the first control chamber and the second control chamber is fluidly connected to one of the first fuel inlet and the second fuel inlet when the first control valve member and the second control valve member are in the respective first positions.

10. A fuel system comprising:
    a plurality of fuel injectors, each fuel injector of the plurality of fuel injectors including
       an injector body defining a first fuel inlet, a second fuel inlet, a first nozzle outlet set, a second nozzle outlet set, and a drain outlet, and defining therein a first control chamber and a second control chamber;
       a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;
       a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;
       a first control valve member positioned in the injector body and being movable along a common centerline between a first position in contact with a first seat at which the first control chamber is fluidly blocked from the drain outlet, and a second position out of contact with the first seat at which the first control chamber is fluidly connected to the drain outlet;
       a second control valve member positioned in the injector body and being movable along the common centerline between a first position in contact with a second seat at which the second control chamber is fluidly blocked from the drain outlet, and a second position out of contact with the second seat at which the second control chamber is fluidly connected to the drain outlet, at least one of the first seat and the second seat being a flat seat, and at least one of the first control valve member and the second control valve member having a self alignment feature with respect to the flat seat;

a source of a first fuel fluidly connected to the first fuel inlet;

a source of a second fuel fluidly connected to the second fuel inlet; and an electronic controller in control communication with each fuel injector of the plurality of fuel injectors, the first fuel differing from the second fuel in at least one of chemical identity, matter phase, and pressure.

11. The fuel system of claim 10 wherein the source of the first fuel includes a first common rail, and the source of the second fuel includes a second common rail.

12. The fuel system of claim 11 wherein the first fuel is natural gas, the second fuel is liquid diesel fuel, the first common rail is at a first pressure, and the second common rail is at a second pressure that is greater than the first pressure.

13. The fuel system of claim 12 wherein the injector body of each fuel injector of the plurality of fuel injectors includes a common conical seat through which the first fuel inlet and the second fuel inlet open.

14. The fuel system of claim 13 wherein one of the first control valve member and the second control valve member is intersected by the common centerline, and an other of the first control valve member and the second control valve member defines a bore therethrough that is concentric with the common centerline.

15. The fuel system of claim 14 wherein each fuel injector includes a first armature operably coupled to move the first control valve member, a second armature operably coupled to move the second control valve member, and a shared stator separating the first armature from the second armature, wherein the first check valve member and the second check valve member of each fuel injector move along a first line and a second line, respectively, that are each parallel to, but spaced apart from, the common centerline, and wherein the first control chamber of each fuel injector is fluidly connected to one of the first fuel inlet and the second fuel inlet through two orifices that are fluidly coupled in parallel when the first control valve member is in the first position.

16. A method for operating a fuel system that has a plurality of fuel injectors, each fuel injector of the plurality of fuel injectors including an injector body defining a first fuel inlet, a second fuel inlet, a first nozzle outlet set, a second nozzle outlet set, and a drain outlet, and each fuel injector defining therein a first control chamber and a second control chamber;

a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;

a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;

a first control valve member positioned in the injector body and being movable along a common centerline between a first position in contact with a first seat at which the first control chamber is fluidly blocked from the drain outlet, and a second position out of contact with the first seat at which the first control chamber is fluidly connected to the drain outlet; and a second control valve member positioned in the injector body and being movable along the common centerline between a first position in contact with a second seat at which the second control chamber is fluidly blocked from the drain outlet, and a second position out of contact with the second seat at which the second control chamber is fluidly connected to the drain outlet, at least one of the first seat and the second seat being a flat seat, and at least one of the first control valve member and the second control valve member having a self alignment feature with respect to the flat seat, the method comprising:

injecting a first fuel from the first nozzle outlet set by moving the first control valve member from the first position to the second position along the common centerline;

injecting a second fuel from the second nozzle outlet set by moving the second control valve member from the first position to the second position along the common centerline; and self aligning one of the first and second control valve members by contacting the flat seat.

17. The method of claim 16 wherein the first fuel is natural gas and the second fuel is liquid diesel fuel.

18. The method of claim 17 further comprising:

supplying the natural gas to the first fuel inlet of the fuel injectors from a gaseous fuel common rail; and supplying liquid diesel fuel to the second fuel inlet of the fuel injectors from a liquid fuel common rail.

19. The method of claim 18 further comprising:

ending a natural gas injection event by moving the first control valve member into contact with the flat seat, which is a first flat seat; and ending a liquid diesel injection event by moving the second control valve member into contact with a second flat seat.

20. The method of claim 19 wherein the step of ending the natural gas injection event includes fluidly connecting the first control chamber to the liquid fuel common rail through a first F orifice and a first Z orifice that are fluidly coupled in parallel, and the step of ending the liquid diesel injection event includes fluidly connecting the second control chamber to the liquid fuel common rail through a second F orifice and a second Z orifice that are fluidly coupled in parallel.

* * * * *